United States Patent
Wang et al.

(10) Patent No.: US 10,634,641 B2
(45) Date of Patent: Apr. 28, 2020

(54) COMBINATION NOX AND OXYGEN SENSOR WITH COMMON GAS CHAMBER

(71) Applicant: DELPHI TECHNOLOGIES IP LIMITED, St. Michael (BB)

(72) Inventors: Da Yu Wang, Troy, MI (US); David M. Racine, Davison, MI (US); Sheng Yao, Troy, MI (US)

(73) Assignee: DELPHI TECHNOLOGIES IP LIMITED (BB)

( * ) Notice: Subject to any disclaimer, the term of this patent is extended or adjusted under 35 U.S.C. 154(b) by 393 days.

(21) Appl. No.: 15/447,977

(22) Filed: Mar. 2, 2017

(65) Prior Publication Data

US 2018/0252672 A1    Sep. 6, 2018

(51) Int. Cl.
  *G01N 27/41* (2006.01)
  *G01N 27/406* (2006.01)
  *G01N 27/407* (2006.01)
  *G01N 27/417* (2006.01)

(52) U.S. Cl.
  CPC ......... *G01N 27/41* (2013.01); *G01N 27/4067* (2013.01); *G01N 27/4073* (2013.01); *G01N 27/4074* (2013.01); *G01N 27/4075* (2013.01); *G01N 27/417* (2013.01)

(58) Field of Classification Search
  CPC ........... G01N 27/4045; G01N 27/4074; G01N 27/404–407; G01N 27/409; G01N 27/419; G01N 27/41; G01N 27/417; F02D 41/146
  See application file for complete search history.

(56) References Cited

U.S. PATENT DOCUMENTS

| | | | | |
|---|---|---|---|---|
| 5,861,092 | A | * | 1/1999 | Kiyota .............. G01N 27/417 205/781 |
| 2002/0108856 | A1 | | 8/2002 | Kunimoto et al. |
| 2004/0094416 | A1 | * | 5/2004 | Chen ................ G01N 27/419 204/426 |
| 2005/0061667 | A1 | | 3/2005 | Suzuki |
| 2006/0151338 | A1 | | 7/2006 | Wang et al. |

(Continued)

FOREIGN PATENT DOCUMENTS

| | | |
|---|---|---|
| DE | 102009050324 A1 | 5/2011 |
| JP | 2001116720 A | 4/2001 |
| JP | 2001221774 A | 8/2001 |

*Primary Examiner* — Gurpreet Kaur
(74) *Attorney, Agent, or Firm* — Joshua M. Haines

(57) ABSTRACT

A sensor system includes a common gas chamber and a reference gas chamber respectively configured to receive an exhaust gas and a reference gas. A Nernst cell is exposed to the common gas chamber and the reference air chamber. The Nernst cell provides a reference signal indicative of an oxygen difference between the common gas chamber and the reference air chamber. An oxygen electrochemical pump cell is exposed to the common gas chamber and exhaust gas and provides an oxygen signal indicative of an oxygen only concentration. A NOx electrochemical cell is exposed to the common gas chamber and provides a NOx signal indicative of a NOx concentration. A processor is in communication with the Nernst cell, the oxygen-only electrochemical pump cell and NOx electrochemical cells. The processor outputs oxygen and NOx signals and provide a NOx concentration and oxygen concentration of the exhaust.

17 Claims, 4 Drawing Sheets

(56) References Cited

U.S. PATENT DOCUMENTS

| | | | |
|---|---|---|---|
| 2010/0077833 A1* | 4/2010 | Wang | G01N 33/0037 |
| | | | 73/23.31 |
| 2011/0023459 A1* | 2/2011 | Nieuwstadt | F02D 41/064 |
| | | | 60/285 |
| 2011/0139619 A1* | 6/2011 | Ikeda | B01J 23/40 |
| | | | 204/427 |
| 2017/0284959 A1* | 10/2017 | Daecke | G01N 27/419 |

* cited by examiner

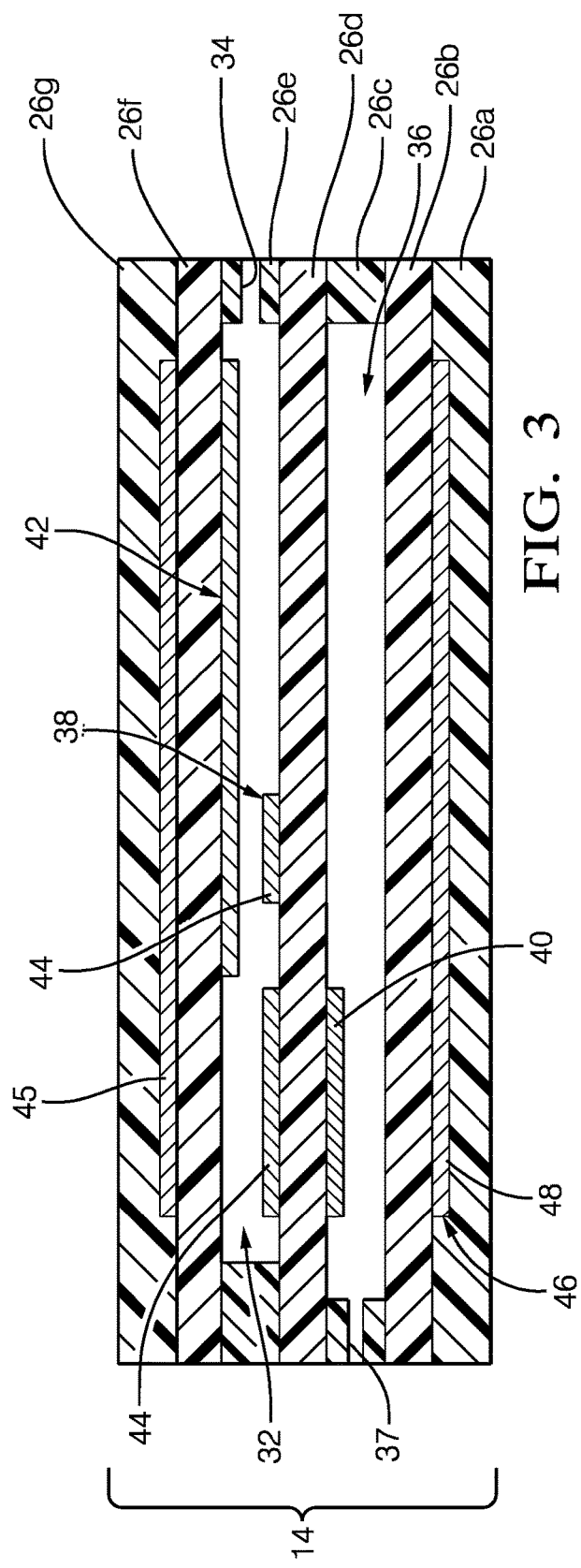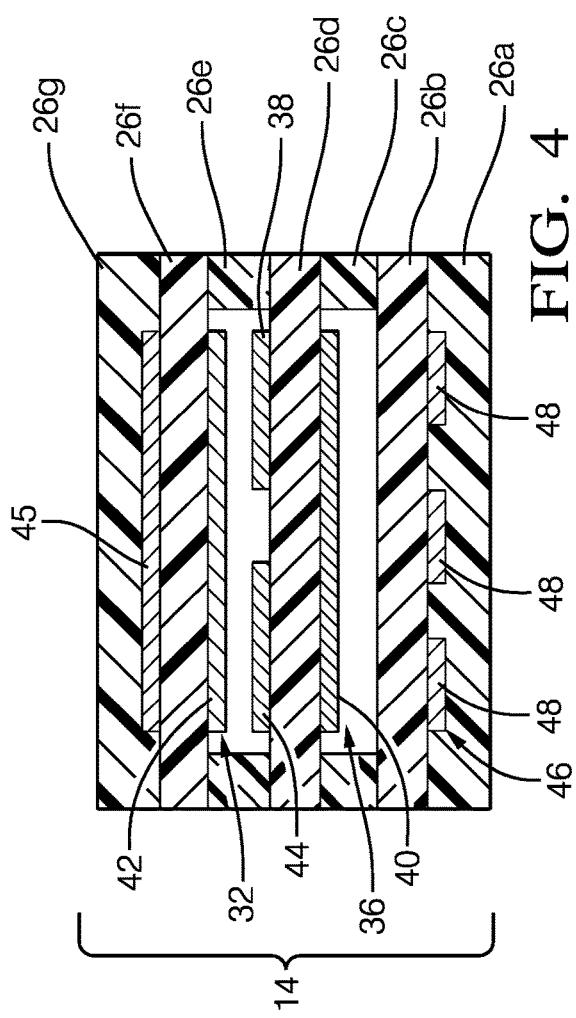

COMBINATION NOX AND OXYGEN SENSOR WITH COMMON GAS CHAMBER

BACKGROUND

The disclosure relates to an exhaust gas sensor capable of sensing at least oxygen and oxides of nitrogen (NOx) content.

Exhaust gas generated by combustion of fossil fuels in furnaces, ovens, and engines contain, for example, NOx, unburned hydrocarbons (HC), and carbon monoxide (CO). Vehicles, e.g., diesel vehicles, utilize various pollution-control after treatment systems, such as a NOx absorber(s) and/or selective catalytic reduction (SCR) catalyst(s), to reduce NOx. Thus, NOx sensors are becoming more prevalent in vehicles, particularly diesel vehicles.

Current NOx sensors on the market use oxygen pump cell technology that is expensive and complicated to produce. There also are some performance limitations to current NOx sensors, such as cross-interference from other gases and accuracy that is not in line with customer expectations.

Commercial NOx sensors are built with two or three in-cascade electrochemical pumping cells requiring eight lead wires for sensor control and operation. In addition to being complicated and cost ineffective, the sensor can only output oxygen concentration and total NOx concentration in ppm. Trying to combine more sensing features into the device (such as ammonia (NH3), nitrogen monoxide (NO), nitrogen dioxide (NO2) sensing) would require more than eight lead wires, adding even more complexity and difficulty to its packaging and manufacture.

What is needed is a combined oxygen and NOx sensor that is accurate, simpler to manufacture, and more cost effective.

SUMMARY

In one exemplary embodiment, a sensor system includes multiple layers that include a common gas chamber and a reference gas chamber respectively configured to receive an exhaust gas and a reference gas. A Nernst cell is exposed to the common gas chamber and the reference air chamber. The Nernst cell is configured to provide a reference signal indicative of an oxygen difference between the common gas chamber and the reference air chamber. An oxygen electrochemical pump cell is exposed to the common gas chamber and exhaust gas and is configured to provide an oxygen signal indicative of an oxygen only concentration. A NOx electrochemical cell is exposed to the common gas chamber and is configured to provide a NOx signal indicative of a NOx concentration. A processor is in communication with the Nernst cell, the oxygen-only electrochemical pump cell and NOx electrochemical cells. The processor is configured to output oxygen and NOx signals and provide a NOx concentration and oxygen concentration of the exhaust.

In a further embodiment of the above, the oxygen electrochemical pump cell includes an oxygen-only pump electrode in the common gas chamber that is supported on one side of a first doped zirconia layer of the multiple layers. The counter-oxygen pump electrode is supported on an opposite side of the one side of the first doped zirconia layer which exposed to exhaust gas.

In a further embodiment of any of the above, the Nernst cell includes EMF and reference electrodes are arranged on opposing sides of a second doped zirconia layer of the multiple layers. The EMF electrode is arranged in the common gas chamber and the reference electrode is arranged in the reference gas chamber. The NOx electrochemical cell includes a NOx sensing electrode arranged in the common gas chamber and shares the same side of a second doped zirconia layer as that of EMF electrode.

In a further embodiment of any of the above, the oxygen-only pump electrode and the EMF electrode share a ground.

In a further embodiment of any of the above, a heater is arranged adjacent to the Nernst cell. The processor is configured to provide a fixed frequency excitation voltage feed into the Nernst cell to obtain the electrolyte impedance between the EMF and reference electrodes and provide a feedback control signal to modulate electrical power to the heater.

In a further embodiment of any of the above, the processor is configured to control a voltage to the oxygen electrochemical pump cell based upon the EMF signal from the Nernst cell.

In a further embodiment of any of the above, a gas diffusion-limiting aperture is provided in at least one of the multiple layers and is in fluid communication with the common gas chamber. The gas diffusion-limiting aperture is configured to regulate an amount of exhaust gas into the common gas chamber.

In a further embodiment of any of the above, the common gas chamber is configured to have a constant ratio of nitrogen monoxide and nitrogen dioxide.

In a further embodiment of any of the above, the common gas chamber is configured to be free from hydrocarbons and carbon monoxide.

In a further embodiment of any of the above, the gas diffusion-limiting aperture includes a precious metal.

In a further embodiment of any of the above, the oxygen-only pump cell and the Nernst cell are configured to have a constant oxygen concentration in the common gas chamber.

In a further embodiment of any of the above, a ceramic metal heater is arranged in the multiple layers adjacent to the Nernst cell.

In a further embodiment of any of the above, a wire pigtail with only six wires is electrically connected to the Nernst cell, the oxygen pump cell, the NOx electrochemical cell and the heater.

In a further embodiment of any of the above, a heater is arranged in the multiple layers arranged adjacent to the Nernst cell. The sensing element includes an ammonia sensing cell and a nitrogen dioxide sensing cell arranged in the multiple doped zirconia layers and respectively configured to provide NH3 and NO2 signals.

In a further embodiment of any of the above, a wire pigtail with only eight wires is electrically connected to the sensor element.

In a further embodiment of any of the above, the processor is configured to output a difference between the NO2 and NOx signals and provide a nitrogen monoxide concentration In a further embodiment of any of the above, a controller is in communication with the process and is configured to command at least one of a fuel system, an emissions system, and an engine control device in response to the NOx concentration.

In another exemplary embodiment, an exhaust gas sensor includes multiple layers that include a common gas chamber and a reference gas chamber respectively configured to receive an exhaust gas and a reference gas. A Nernst cell is exposed to the common gas chamber and the reference air chamber. The Nernst cell is configured to provide a reference signal indicative of an oxygen difference between the common gas chamber and the reference air chamber. An oxygen-only electrochemical pump cell is exposed to the common gas chamber and the exhaust and is configured to provide an oxygen signal indicative of an oxygen concentration. A NOx electrochemical cell is exposed to the common gas chamber and is configured to provide a NOx signal indicative of a NOx concentration. A heater is arranged in the multiple layers.

In a further embodiment of any of the above, a wire pigtail with only six wires is electrically connected to the Nernst cell, the oxygen-only pump, NOx electrochemical cell, and the heater.

In a further embodiment of any of the above, an ammonia sensing cell and a nitrogen dioxide sensing cell are arranged in the multiple layers and respectively configured to provide NH3 and NO2 signals. A wire pigtail with only eight wires is electrically connected to the Nernst cell, the oxygen-only pump, the NOx electrochemical cells, the ammonia sensing cell, the nitrogen dioxide sensing cell, and the heater.

BRIEF DESCRIPTION OF THE DRAWINGS

The disclosure can be further understood by reference to the following detailed description when considered in connection with the accompanying drawings wherein:

FIG. 3 is a first cross-sectional view through a sensing element of the exhaust gas sensor of FIG. 2.

FIG. 4 is a second cross-sectional view through the sensing element of the exhaust gas sensor of FIG. 2.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
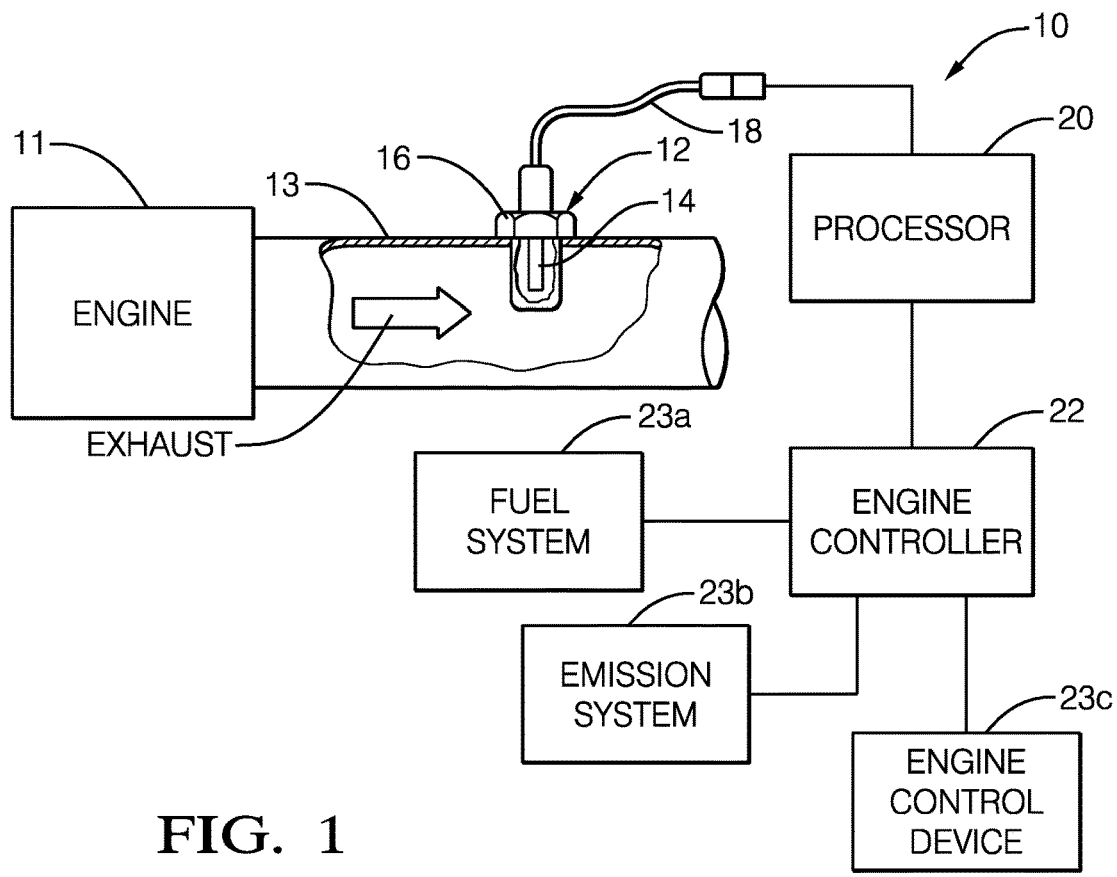
FIG. 1 is a schematic view of an exhaust sensor system.

A sensor system 10 is schematically shown in FIG. 1. The system 10 includes an exhaust gas sensor 12 connected to a processor 20 by a wire pigtail 18. The exhaust gas sensor 12 is arranged in an exhaust system 13 downstream from an engine 11 to maintain engine operating efficiency and low vehicle emissions by sensing the byproducts of engine combustion.

A sensing element 14 is arranged within a housing 16 of the exhaust gas sensor 12 that is grounded to the exhaust system 13. In one disclosed embodiment, the sensing element 14 outputs signals indicative of oxygen (O2) concentration (or air/fuel ratio) and total oxides of nitrogen (NOx) concentration, which are then received and interpreted by the processor 20. The relevant exhaust gas constituent information is provided to an engine controller 22, which may command various vehicle systems, such as a fuel system 23a, an emissions system 23b, and/or engine control device 23c. It should be understood that the processor 20 and controller 22 may be integrated with one another, or they may be separate, discrete units remotely located from one another.

Figure 2:
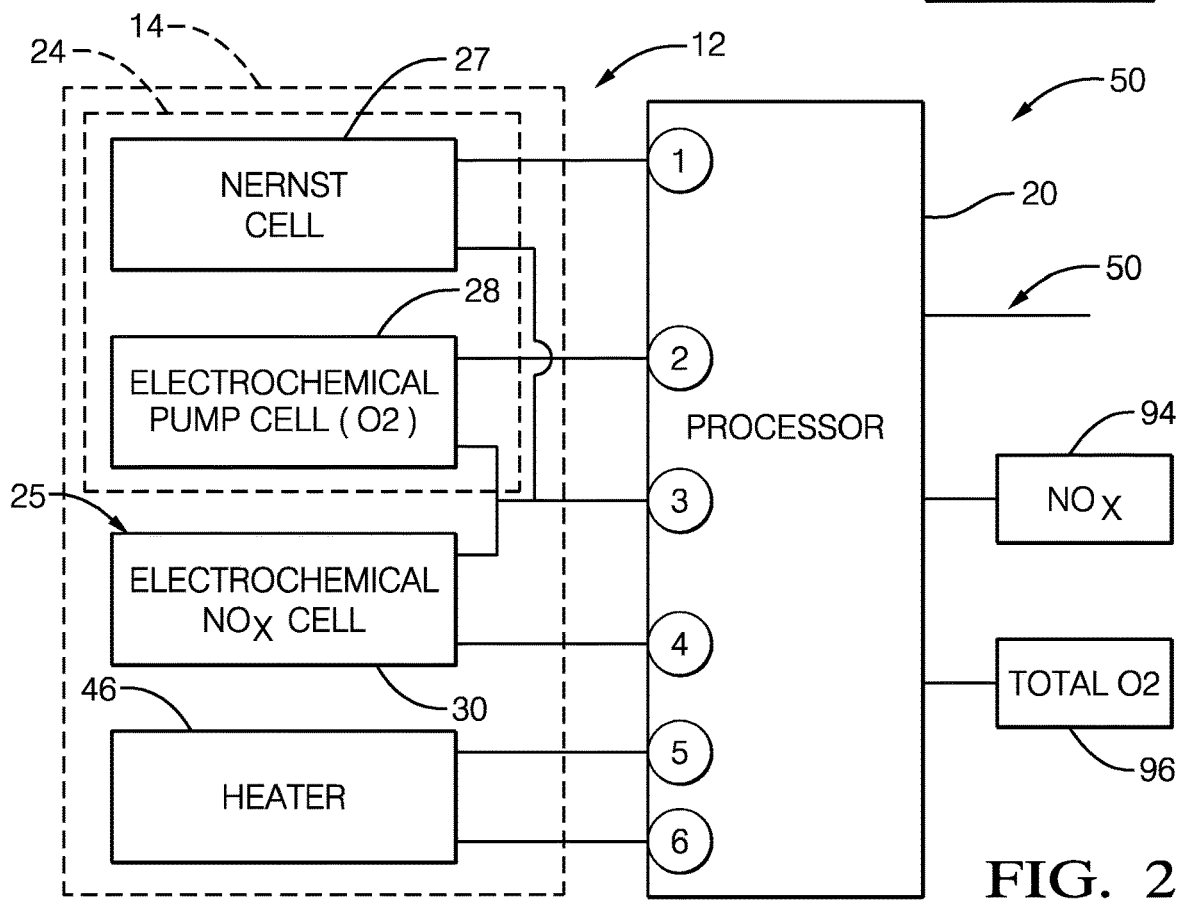
FIG. 2 is one example embodiment of an exhaust gas sensor, with a Nernst cell, an oxygen-only pump cell and a NOx electrochemical cell, in communication with a processor.

Referring to FIG. 2, the sensing element 14 includes a wide range air/fuel ratio (WRAF) sensor 24 and an electrochemical (mixed-potential) NOx sensor 25 arranged amongst layers of material to provide a single sensor structure using thick- or thin-film multi-layer ceramic technology. The WRAF sensor 24 senses the air/fuel ratio of the engine exhaust and provides a constant oxygen gas environment that is free of carbon monoxide (CO) and hydrocarbons (HC), which creates a constant nitrogen monoxide (NO) to nitrogen dioxide (NO2) ratio at a constant temperature. The NOx sensor 25 senses the total NOx under the conditions created by the WRAF sensor 24.

Figure 6:
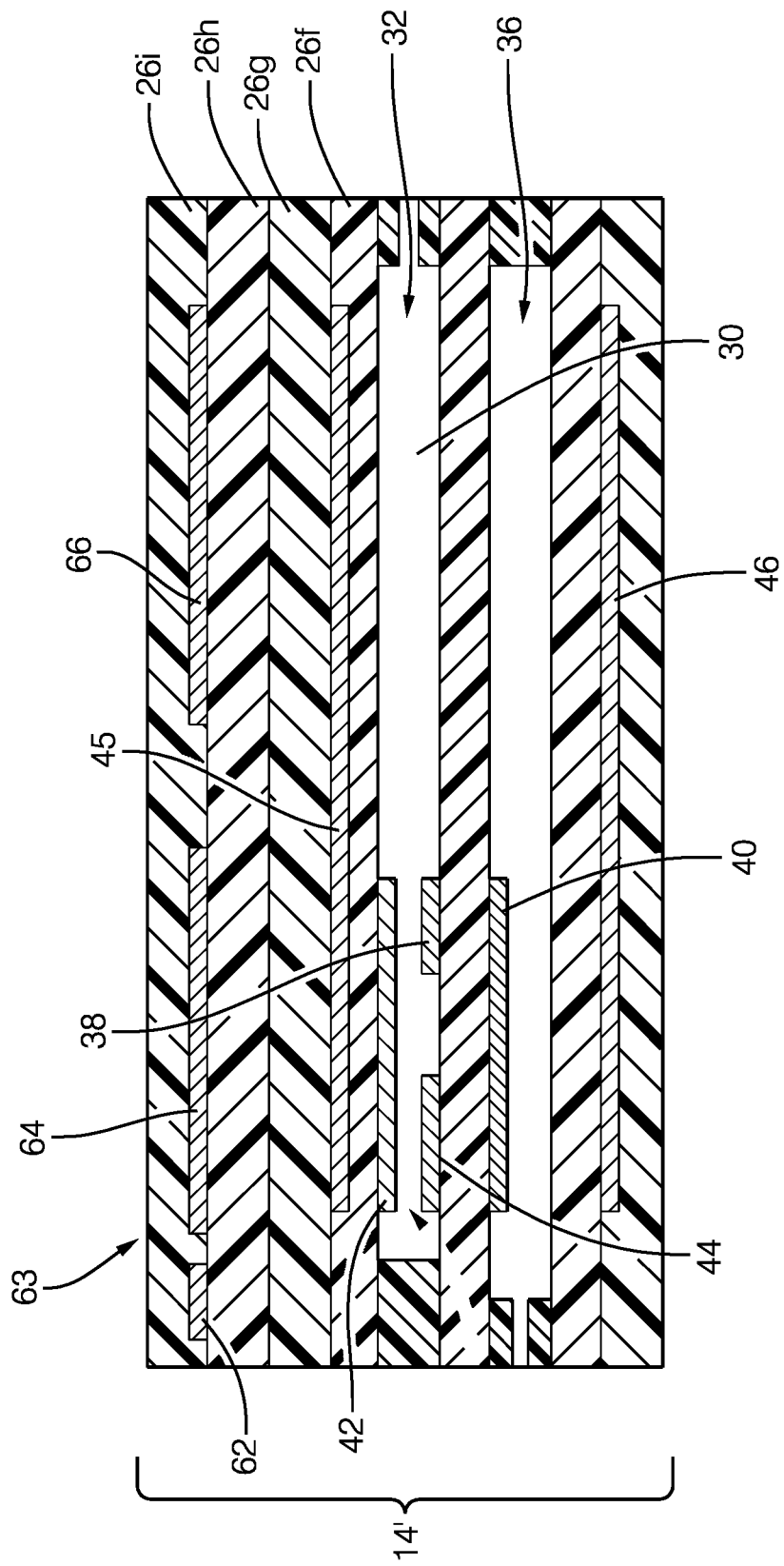
FIG. 6 is another example embodiment of an exhaust gas sensor.

The WRAF sensor 24 includes a Nernst cell 27 and an oxygen-only electrochemical pump cell 28 that pumps oxygen only in and out of a common gas chamber 32 (FIGS. 3, 4 and 6). The NOx sensor 25 includes a NOx electrochemical cell 30 that detects NOx in the common gas chamber 32. In general, the signals of the WRAF sensor 24 and the mixed-potential NOx sensor 25 provide an accurate O2 and NOx measurement.

Both WRAF and NOx sensors 24, 25 share a common gas chamber 32, as shown schematically in FIGS. 3, 4, and 6. The common gas chamber 32 has a gas diffusion-limiting aperture 34 connecting the common gas chamber 32 to the engine exhaust atmosphere. The gas diffusion-limiting aperture 34 may have a precious metal catalyst (i.e., palladium, rhodium, platinum and their alloys) to oxidize unburned CO and HC, which allows NOx to reach its thermodynamic ratio of NO and NO2 once inside the common gas chamber 32. The operation of the WRAF sensor 24 is to control the gas atmosphere within the common gas chamber 32 to a fixed oxygen concentration against a reference gas or air. Since the WRAF sensor 24 provides a stable gas environment within the common gas chamber 32, the NOx sensor 25 may then provide an accurate NOx signal.

Returning to FIG. 2, with the example sensor 12, six wires (indicated by circled numerals 1-6) connect the sensing element 14 to the processor 20, which provides a simpler, less costly configuration as compared to prior art NOx sensors. The processor 20 provides outputs 50 to the engine controller 22 relating to at least oxygen (or air/fuel ratio) and NOx presence in the exhaust gas.

A heater 46 is powered by two of the six wires and is used to quickly heat the sensing element 14 to a desired operating temperature to provide more immediate gas constituent sensing. As shown in FIGS. 3 and 4, the heater 46 is made of a precious metal based serpentine 48 printed between two electrically insulated ceramic layers 26a, 26b. The layers may be made of alumina, silica and/or their alloys and provides electrical isolation at elevated temperatures typical during sensor operation. The serpentine 48 has two electrical leads connected to two pads at the end of the ceramic substrate where modulated voltage may be fed in from a controller 22 to control heating of the sensing element 14.

The Nernst cell 27 and the oxygen-only electrochemical pump cell 28 share the common gas chamber 32. The Nernst cell includes an electromotive force (EMF) electrode 38 located within the common gas chamber 32 and a reference electrode 40 exposed to air or a reference gas supplied by an inlet 37 in a layer 26c to a reference air chamber 36. The EMF electrode 38 and the reference electrode 40 are on opposite sides of a layer 26d of solid oxide electrolyte, for example, an aliovalent doped zirconia-based material.

The oxygen-only electrochemical pump cell 28 has an oxygen-only pump electrode 42 exposed to the common gas chamber 32, which is bounded by layer 26e. The counter electrode 45 is separated by and supported on a solid oxide electrolyte layer 26f, such as partially stabilized or fully stabilized zirconia doped with alumina or yttria, along with the oxygen-only electrode 42 attached to the opposite side of layer 26f. The counter electrode 45 is exposed to the ambient exhaust gas atmosphere through porous layer 26g. The oxygen-only pump electrode 42 and the EMF electrode 38 of the Nernst cell 27 may be electrically connected together. The electrolyte layers may be common or separate.

The electrodes of the Nernst cell 27 are made of a platinum or platinum alloy, such as platinum-rhodium-palladium alloys. The platinum-based electrodes within the common gas chamber 32 and precious metal based catalyst in the gas limiting aperture 34 keep the gas free of HC and CO, maintaining a constant NO to NO2 ratio of the total NOx gas being measured. The oxygen-only electrode 42 of the oxygen-only electrochemical pump cell 28 is made of gold, gold-alloy, or gold-platinum alloys. The counter electrode 45 of the oxygen-only electrochemical pump cell 28 can be made of gold, gold-alloy, gold-platinum-alloy, platinum, platinum-palladium-rhodium-alloy. The Nernst cell 27 and the oxygen electrochemical pump cell 28 electrodes may share the same electrolyte layer or have separate electrolyte layers. The NOx sensor 25 may share its reference electrode with the common ground, e.g., electrode 42 and 38, or share its reference electrode with that of the Nernst cell 27 reference electrode 40.

The Nernst cell 27 and the oxygen-only electrochemical pump cell 28 have leads connected to the pad area at the end of the sensing element 14. The processor 20 will read the EMF of the Nernst cell 27 and use it as a feedback loop signal to control the pump current to pump oxygen in or out of the common gas chamber 32 so that the EMF of the Nernst cell 27 will be kept at a constant value, which will be appreciated from the circuit diagram shown in FIG. 5. The pump current will be limited by the gas diffusion-limiting aperture 34 of the common gas chamber 32 and the limiting pump current is used to determine the oxygen concentration in exhaust as well as the air/fuel ratio of the engine exhaust.

The Nernst cell 27 may be used as a temperature sensing cell also. The processor 20 uses fixed frequency excitation voltage feed into the Nernst cell 27 to obtain the electrolyte impedance between the EMF and reference electrodes 38, 40 and uses this impedance as a feedback control signal to modulate the electrical power to the heater 46 and maintain the sensing element 14 sensing tip at a constant temperature.

The electrochemical NOx sensor 25 includes a NOx electrode 44 constructed from, for example, a manganese silicate compound or composites, chromite, terbium chromite, rhodium, rhodium-platinum alloy, indium-gallium-oxide alloy, zinc-indium-gallium oxide alloy, gold-platinum alloy, gold or any other suitable materials that will generate NOx mixed potential effect when exposed to NOx. The NOx mixed potential sensing signal can be read between electrode 44 and electrode 38 or electrode 40. This mixed potential signal represents NOx concentration. The NOx sensing electrodes 44 has lead connected to the pad area at the end of the sensing element 14 (wire 4 in FIG. 2). The processor 20 or the controller 22 will read the NOx sensing EMF provided by the NOx sensor and convert this EMF to NOx concentration in ppm using conversion equations and/or calibration tables. In the example shown in FIGS. 3 and 4, the oxygen and NOx sensing electrodes 38, 44 are shown arranged parallel longitudinally, but it should be understood that these electrodes may be arranged end-to-end instead, if desired.

The processor 20 and/or controller 22 have the circuitry to provide electrical power to the sensor with feedback loop control functions. The processor 20 is capable of reading the parameters memorized in EEPROM embedded in the sensor package and has microprocessor to operate the electrochemical cells 27, 28, 30, to monitor the sensing signals and convert the sensing signals to gas compositions in percentage or ppm. Processor 20 may communicate with the engine control module (ECM) or urea dispense controllers and exchange data for the purpose of engine control, exhaust after treatment control and onboard diagnostics (OBD).

Figure 5:
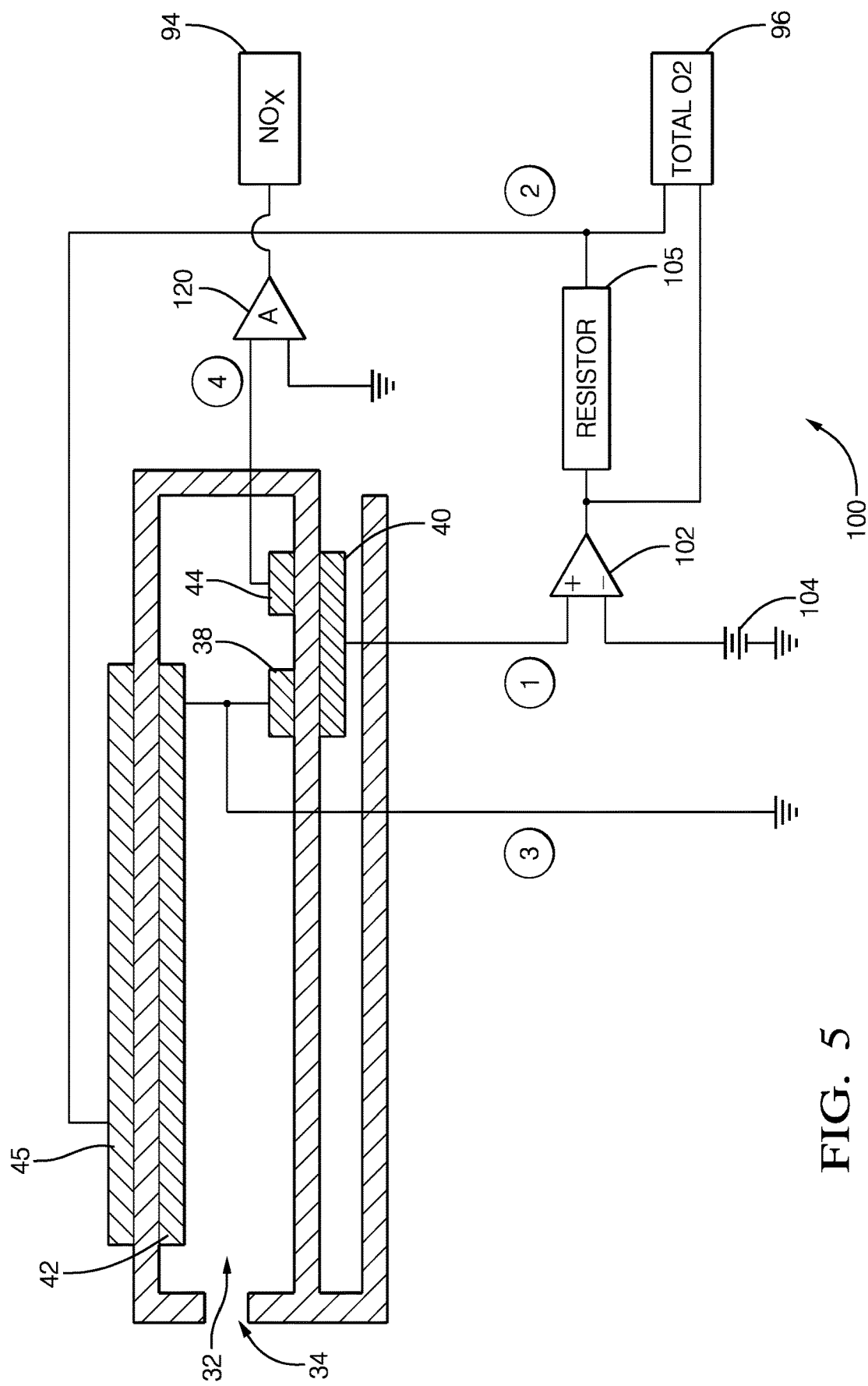
FIG. 5 is a block circuit diagram of portions of the exhaust gas sensor and the processor shown in FIG. 2.

An example block circuit 100 for the processor 20 is shown in FIG. 5. The four wires ("Wire 1," "Wire 2," "Wire 3," "Wire 4") associated with the Nernst cell 27, electrochemical pump cell 28, and NOx electrochemical cell 30 are indicated by the circled numerals 1-4 (FIG. 2 and FIG. 5). Wire 3 provides a common ground.

Referring to FIGS. 2 and 5, the processor 20 outputs NOx concentration 94 and total O2 concentration 96 (or air to fuel ratio). EMF electrode 38 of Nernst cell 27 and oxygen-only pump electrode 42 of oxygen electrochemical pump cell 28 share the same common gas chamber 32 with the gas-diffusion-limiting aperture 34 to communicate with ambient exhaust gas. Returning to FIG. 5, a signal from the Nernst cell 27 is provided by Wire 1 to an operational amplifier 102, which supplies a reference voltage signal for comparison. The reference voltage is from a reference voltage source 104. The amount of the reference voltage is determined by the NOx electrochemical electrode 44 material used and may be in a range between 75 mV to 500 mV. The operational amplifier 102 provides a pump voltage to pump oxygen in and out of the common gas chamber until the minimum voltage difference is achieved between the reference voltage and the EMF of the Nernst cell 27. The pump current will drive through a resistor 105, and the drop-down voltage through the resistor 105 is output as an indication of the total O2 concentration signal. Since the pump current will be a function of the oxygen concentration of the exhaust. The total oxygen concentration (or the air to fuel ratio) of the exhaust can be converted and properly outputted.

An EMF signal from the NOx electrochemical pump cell 30 provided by Wire 4 to an amplifier 120 and outputs a reading of the NOx sensing signal. Since this signal represents the mixed potential of a NOx concentration within the common gas chamber with a specific NO to NO2 ratio as fixed by WRAF sensor 24, the total NOx concentration can be converted from the sensing signal and outputs accordingly as the total NOx concentration 94.

The disclosed six wire exhaust gas sensor may be built with additional sensing features. More cells may be provided in the separate electrolyte layers, as shown in FIG. 6, such that additional exhaust species could be measured or derived. For example, additional solid oxide electrolyte layers 26h can be added on top of electrolyte layer 26f with an isolation layer 26g in between which has open gas aperture between the electrode 45 and layer 26g with the aperture open to the exhaust to allow oxygen freely diffuse between the electrode 45 and the exhaust. Of course, additional or fewer electrodes and layers may be provided.

The extra solid electrolyte layer 26h will have two mixed potential gas sensing cells built on the surface of the electrolyte layer with their reference electrodes shared. All the electrodes of the two cells are exposed to the same ambient exhaust atmosphere with layer 26*i* as the poison protection porous coating layer.

The sensing element 14' includes an ammonia (NH3) sensing cell and NO2 sensing cell. The NH3 sensing cell has a common reference electrode 62 and a NH3 sensing electrode 64. The NO2 sensing cell is provided by a NO2 sensing electrode 66, which cooperates with the common reference electrode 62. Both NH3 and NO2 sensing cells use a mixed-potential principle for NH3 and NO2 sensing. The common reference electrode 62 may share the same common ground wire (Wire 3 in FIG. 5) with the electrode 38 and pump electrode 42.

The common reference electrode 62 may be constructed with materials the same as reference electrode 40 or electrode 38. The NH3 electrode 64 may be constructed of NH3-suitable sensing materials, for example, bismuth vanadium oxide with magnesium oxide as an additive. The NO2 sensing electrode 66 may be made of NO2-suitable sensing materials, for example, manganese silicate materials with cobalt oxide, zinc oxide and/or alumina oxide as an additive.

The NH3 and NO2 sensing electrodes 64, 66 use two additional lead wires (a total of eight wires for sensor 14') to communicate EMF sensing signals from the NH3 and NO2 sensing cells to the processor 20. The processor 20 may receive the NO2 sensing EMF signal from the NO2 sensing cell and utilize the onboard information of oxygen (Oxygen gas has an interference effect on the NO2 sensing EMF signal) to correct and convert the NO2 EMF signal into the NO2 signal in ppm.

The processor 20 may receive the NH3 sensing EMF signal from the NH3 sensing cell and utilize the onboard information of oxygen and NO2 (both gases have interference effect on the NH3 sensing EMF signal) to correct and convert the NH3 EMF signal into the NH3 signal in ppm. Water also has an interference effect and its concentration may be obtained from oxygen information through the air/fuel ratio relationship and correction may be done accordingly.

Afterwards, the existing NOx information may be corrected with NH3 in ppm (NH3 is an interference gas to the NOx gas sensing). The interference-free information of NOx then may be used to provide NO in ppm by using corrected NO2 in ppm. In this way, oxygen, A/F, NH3, NOx, NO, and NO2 concentrations may be correctly sensed and reported to the controller 22 for control of the exhaust after treatment module or other control applications or onboard sensing applications.

The sensing elements 14, 14' may be covered with a proper poison protection coating layer, which may be made of any known technology that may provide such protection function against the exhaust poisons. Catalytic chemicals may be added into the coating material to eliminate or decrease unwanted cross-interference effects from other exhaust constituents.

The sensing elements 14, 14' may be packaged with any known packaging technology that would provide the element with mechanical, thermomechanical, and shock-vibrational impact protection. The package for the sensor 12 may include a multi-parameter-memory-chip (e.g., EEPROM chip) that stores calibration tables, conversion equations, conversion parameters, and temperature control parameters.

The disclosed sensor 12 combines the reliability of Nernst cell, and O2-only pump cell technology and its ability to create a specific atmosphere for the NOx mixed potential electrochemical sensing. Together with silicon microelectronics technology, they enables a reduced number of lead wire (from eight to six) for NOx sensing, which makes the sensor structure simpler and easier to manufacture. This permits more sensing functions into the existing sensor body with only a few more wires, making it possible to manufacture a true combination sensor that may sense multiple gases in engine exhaust (O2, A/F, NH3, NO, NO2, NOx). The disclosed sensor 12 is easier to produce with lower cost, while addressing some of the industry's concern with current pump cell NOx sensors performance.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A sensor system comprising:

multiple layers that include a common gas chamber and a reference gas chamber respectively configured to receive an exhaust gas and a reference gas;

a Nernst cell exposed to the common gas chamber and the reference gas chamber, the Nernst cell configured to provide a reference signal indicative of an oxygen difference between the common gas chamber and the reference gas chamber;

an oxygen electrochemical pump cell exposed to the common gas chamber and the exhaust gas, and configured to provide an oxygen signal indicative of an oxygen only concentration;

a NOx electrochemical cell exposed to the common gas chamber and configured to provide a NOx signal indicative of a NOx concentration;

a processor in communication with the Nernst cell, the oxygen electrochemical pump cell and NOx electrochemical cells, the processor configured to output oxygen and NOx signals and provide a NOx concentration and oxygen concentration of the exhaust gas;

a heater arranged in the multiple layers adjacent to the Nernst cell; and a wire pigtail with only six wires electrically connected to the Nernst cell, the oxygen electrochemical pump cell, the NOx electrochemical cell and the heater;

wherein a first wire of the only six wires is electrically connected to a reference electrode located in the reference gas chamber;

wherein a second wire of the only six wires is electrically connected to a counter-oxygen electrode pump electrode which is exposed to the exhaust gas and which is not in either of the reference gas chamber or the common gas chamber;

wherein a third wire of the only six wires is electrically connected to an oxygen-only pump electrode of the oxygen electrochemical pump cell such that the oxygen pump electrode is located in the common gas chamber, the third wire is also electrically connected to an EMF electrode which is located in the common gas chamber;

wherein a fourth wire of the only six wires is electrically connected to a NOx sensing electrode which is located within the common gas chamber; and wherein a fifth wire and a sixth wire of the only six wires are electrically connected to the heater.

2. The sensor system of claim 1, wherein the oxygen electrochemical pump cell includes the oxygen-only pump electrode in the common gas chamber, supported on one side of a first doped zirconia layer of the multiple layers, and the counter-oxygen pump electrode supported on an opposite side of the one side of the first doped zirconia layer which exposed to exhaust gas.

3. The sensor system of claim 2, wherein the Nernst cell includes the EMF electrode and the reference electrode arranged on opposing sides of a second doped zirconia layer of the multiple layers, the EMF electrode arranged in the common gas chamber, and the reference electrode arranged in the reference gas chamber, wherein the NOx electrochemical cell includes the NOx sensing electrode arranged in the common gas chamber and shares the same side of a second doped zirconia layer as that of EMF electrode.

4. The sensor system of claim 3, wherein the oxygen-only pump electrode and the EMF electrode share a ground.

5. The sensor system of claim 3, wherein the processor is configured to provide a fixed frequency excitation voltage feed into the Nernst cell to obtain the electrolyte impedance between the EMF and reference electrodes and provide a feedback control signal to modulate electrical power to the heater.

6. The sensor system of claim 3, wherein the processor is configured to control a voltage to the oxygen electrochemical pump cell based upon an EMF signal from the Nernst cell.

7. The sensor system of claim 1, comprising a gas diffusion-limiting aperture provided in at least one of the multiple layers and in fluid communication with the common gas chamber, the gas diffusion-limiting aperture configured to regulate an amount of exhaust gas into the common gas chamber.

8. The sensor system of claim 7, wherein the common gas chamber is configured to have a constant ratio of nitrogen monoxide and nitrogen dioxide.

9. The sensor system of claim 7, wherein the common gas chamber is configured to be free from hydrocarbons and carbon monoxide.

10. The sensor system of claim 9, wherein the gas diffusion-limiting aperture includes a precious metal catalyst.

11. The sensor system of claim 1, wherein the oxygen electrochemical pump cell and the Nernst cell are configured to have a constant oxygen concentration in the common gas chamber.

12. The sensor system of claim 1, wherein the sensor system includes an ammonia sensing cell and a nitrogen dioxide sensing cell arranged in the multiple doped zirconia layers and respectively configured to provide NH3 and NO2 signals.

13. The sensor system of claim 12, comprising a wire pigtail with only eight wires electrically connected to the Nernst cell, the oxygen electrochemical pump cell, the NOx electrochemical cell, the heater, the ammonia sensing cell, and the nitrogen dioxide sensing cell.

14. The sensor system of claim 12, wherein the processor is configured to output a difference between the NO2 and NOx signals and provide a nitrogen monoxide concentration.

15. The sensor system of claim 12, comprising a controller in communication with the processor and configured to command at least one of a fuel system, an emissions system, and an engine control device in response to the NOx concentration.

16. An exhaust gas sensor comprising:

multiple layers that include a common gas chamber and a reference gas chamber respectively configured to receive an exhaust gas and a reference gas;

a Nernst cell exposed to the common gas chamber and the reference gas chamber, the Nernst cell configured to provide a reference signal indicative of an oxygen difference between the common gas chamber and the reference gas chamber;

an oxygen-only electrochemical pump cell exposed to the common gas chamber and the exhaust gas, and configured to provide an oxygen signal indicative of an oxygen concentration;

a NOx electrochemical cell exposed to the common gas chamber and configured to provide a NOx signal indicative of a NOx concentration;

a heater arranged in the multiple layers; and a wire pigtail with only six wires electrically connected to the Nernst cell, the oxygen electrochemical pump cell, the NOx electrochemical cell, and the heater;

wherein a first wire of the only six wires is electrically connected to a reference electrode located in the reference gas chamber;

wherein a second wire of the only six wires is electrically connected to a counter-oxygen electrode pump electrode which is exposed to the exhaust gas and which is not in either of the reference gas chamber or the common gas chamber;

wherein a third wire of the only six wires is electrically connected to an oxygen-only pump electrode of the oxygen electrochemical pump cell such that the oxygen pump electrode is located in the common gas chamber, the third wire is also electrically connected to an EMF electrode which is located in the common gas chamber;

wherein a fourth wire of the only six wires is electrically connected to a NOx sensing electrode which is located within the common gas chamber; and wherein a fifth wire and a sixth wire of the only six wires are electrically connected to the heater.

17. The sensor of claim 16, comprising an ammonia sensing cell and a nitrogen dioxide sensing cell arranged in the multiple layers and respectively configured to provide NH3 and NO2 signals, and comprising a wire pigtail with only eight wires electrically connected to the Nernst cell, the oxygen-only electrochemical pump cell, the NOx electrochemical cell, the ammonia sensing cell, the nitrogen dioxide sensing cell, and the heater.

* * * * *